United States Patent
Kuehn (10) Patent No.: US 11,879,588 B2
(45) Date of Patent: Jan. 23, 2024

(54) SUPPORT SYSTEM FOR SUPPORTING AND SECURING A WALL STRUCTURE TO A BARRIER

(71) Applicant: Behrens & Associates, Inc., Hawthorne, CA (US)

(72) Inventor: Steven S. Kuehn, Napa, CA (US)

(73) Assignee: BEHRENS & ASSOCIATES, INC., Hawthorne, CA (US)

( * ) Notice: Subject to any disclaimer, the term of this patent is extended or adjusted under 35 U.S.C. 154(b) by 693 days.

(21) Appl. No.: 17/097,835

(22) Filed: Nov. 13, 2020

(65) Prior Publication Data

US 2021/0140582 A1 May 13, 2021

Related U.S. Application Data (60) Provisional application No. 62/934,745, filed on Nov. 13, 2019.

(51) Int. Cl.
*E04H 17/16* (2006.01)
*F16M 13/02* (2006.01)

(52) U.S. Cl.
CPC ............ *F16M 13/02* (2013.01); *E04H 17/16* (2013.01)

(58) Field of Classification Search
CPC .......... E04H 17/16; E04H 17/17; E01F 15/08; E01F 15/083; E01F 15/088; E01F 8/00; E01F 8/0005; E01F 8/0023
See application file for complete search history.

(56) References Cited

U.S. PATENT DOCUMENTS

| | | | | |
|---|---|---|---|---|
| 3,664,626 A | * | 5/1972 | Snellar | G09F 7/18 248/224.7 |
| 5,015,119 A | * | 5/1991 | Schmanski | E01F 7/06 404/9 |
| 5,208,585 A | * | 5/1993 | Sprague | E01F 9/669 116/DIG. 16 |

(Continued)

FOREIGN PATENT DOCUMENTS

| | | |
|---|---|---|
| JP | 2006249911 | 9/2006 |
| JP | 2014240580 | 6/2013 |
| WO | WO2009035637 | 3/2009 |

OTHER PUBLICATIONS

"K-Rail Mounted Temporary Sound Wall", [https://web.archive.org/web/20180612195523/http://www.environmental-noise-control.com/products/k-rail-mounted-temporary-sound-wall/], (This is an archived version of your webpage captured more than one year ago, on Jun. 12, 2018.).

(Continued)

*Primary Examiner* — Jonathan P Masinick
(74) *Attorney, Agent, or Firm* — Cislo & Thomas, LLP (57) ABSTRACT

A wall support system is provided and includes an adjustable bracket system that attaches a bracket support beam to one or more of the traffic barriers. The adjustable bracket system includes two bracket members spaced apart by a top connecting member; where the top connecting member supports the bracket assembly straddled overtop the bracket support beam which is laid transversely atop one or more barriers. The bracket members are fastened to the barrier and tightened to the bracket support beam. This creates an adjustable system that corn accommodate barriers of various cross-sectional widths and wall angles, to form a strong connection between a framework and the barriers.

16 Claims, 4 Drawing Sheets

(56) References Cited

U.S. PATENT DOCUMENTS

| | | | |
|---|---|---|---|
| 5,406,039 A * | 4/1995 | Rerup | E01F 8/0017 |
| | | | 181/294 |
| 6,718,672 B1 * | 4/2004 | Wieringa | G09F 19/22 |
| | | | 40/607.13 |
| 7,069,680 B1 * | 7/2006 | Crawford | G09F 7/18 |
| | | | 24/502 |
| 7,104,720 B2 | 9/2006 | Humphries et al. | |
| 7,220,077 B2 | 5/2007 | Humphries et al. | |
| 7,823,348 B1 * | 11/2010 | Leiva | E02D 27/42 |
| | | | 52/297 |
| 9,010,228 B2 | 4/2015 | White et al. | |
| 9,587,649 B2 * | 3/2017 | Oehring | H02K 9/04 |
| 10,335,707 B2 * | 7/2019 | Nunes | A63K 1/00 |
| 2012/0093581 A1 | 4/2012 | Lamore | |
| 2018/0320405 A1 * | 11/2018 | Matthews | E04H 12/2276 |

OTHER PUBLICATIONS

"Construction Site Sound Blanket Fence", [https://www.enoisecontrol.com/applications/construction-site-sound-blanket-fence/].
"Concrete Jersey Barriers—Precast Road Barriers" [https://www.jaybro.com.au/about/concrete-jersey-barriers/].

* cited by examiner fig.3 fig.4 fig. 5 fig. 6 fig. 7 fig. 8

SUPPORT SYSTEM FOR SUPPORTING AND SECURING A WALL STRUCTURE TO A BARRIER

CROSS-REFERENCE TO RELATED APPLICATIONS

This application claims priority to U.S. Provisional Patent Application Ser. No. 62/934,745, titled "Support System for Supporting and Securing a Wall Structure to a Barrier," filed Nov. 13, 2019. The contents of that application are incorporated by reference in their entirety.

BACKGROUND

The present invention relates to attaching a wall structure to a barrier, and more particularly, to devices and methods for attaching a wall structure framework to concrete barriers of varying sizes and shapes.

Temporary walls are erected for various purposes, including privacy, noise abatement, security, beautification, and so on. In one application, sound attenuating panels and/or blankets are hung or attached to a framework. The resulting sound attenuating wall, often being tens of feet tall, is susceptible to toppling due to lateral wind forces. Thus, the sound attenuating wall must be anchored securely. In applications where ground or road surface penetration is not permitted, anchoring is achieved by attaching the framework to one or more concrete traffic barriers (also known as Jersey barriers or K-rails) or similar heavy objects.

The problem with existing brackets and the associated structural support is that the shape of the concrete road barriers vary greatly from region to region, such that an attachment means made for one particular type of barrier would be ill suited for attachment to another type of barrier. While the attachment means perfectly fits one type of barrier, it may fit loosely on another, leaving large gaps between the attachments means and the barrier, creating weaknesses.

It is a desire to provide an attachment means that securely holds a wall and its associated framework to a variety of concrete barriers, while avoiding gaps, and while creating a firm connection.

SUMMARY

In one or more embodiments, the present invention is directed to my wall support system for attachment to a concrete barrier having a top wall, a first side wall, a second side wall opposing the first side wall, and a bottom wall configured to rest upon a support surface is provided and comprises a bracket and a wall framework. The bracket has a left bracket member spaced apart from a right bracket member and a top connecting member spanning between and connecting the left bracket member to the right bracket member. The left bracket member also has a left attachment portion and the right bracket member has a right attachment portion. The wall framework has a wall support beam and a bracket support beam attached to and extending transversely from the wall support beam.

The bracket support beam is configured to transversely extend across the top wall of the concrete barrier. Additionally, the bracket is configured to be positioned overtop the bracket support beam, with the top connecting member situated above the bracket support beam, such that the bracket straddles the bracket support beam with the left bracket member and the right bracket member on opposites sides of the bracket support beam. Also, the left attachment portion of the left bracket member and the right attachment portion of the right bracket member are each configured to be fastened to the first side wall of the concrete barrier to hold the bracket support beam to the concrete barrier.

In an additional optional aspect of one or more of the above embodiments of the present invention, the bracket further has a bottom connecting member spanning between and connecting the left bracket member to the right bracket member and configured to be situated below the bracket support beam to capture the bracket support beam between the top connecting member and the bottom connecting member.

In an additional optional aspect of one or more of the above embodiments of the present invention, the attachable top connecting member includes a top bolt with a top nut threaded thereon, capturing therebetween the left bracket member and the right bracket member.

In an additional optional aspect of one or more of the above embodiments of the present invention, the attachable bottom connecting member includes a bottom bolt with a bottom nut threaded thereon, capturing there in between the left bracket member and the right bracket member.

In an additional optional aspect of one or more of the above embodiments of the present invention, the bottom connecting member is configured to be installed after the top connecting member is situated above the bracket support beam.

In an additional optional aspect of one or more of the above embodiments of the present invention, the wall system further includes a second bracket. The second bracket has a second left bracket member spaced apart from a second right bracket member and a second top connecting member spanning between and connecting the second left bracket member to the second right bracket member. The second left bracket member has a second left attachment portion and the second right bracket member has a second right attachment portion. Further, the second bracket is configured to be positioned overtop the bracket support beam with the second top connecting member situated above the bracket support beam, such that the second bracket straddles the bracket support beam. with the second left bracket member and the second right bracket member on opposites sides of the bracket support beam, Additionally, the second left attachment portion of the second left bracket member and the second right attachment portion of the second right bracket member are each configured to be fastened to the second side wall of the concrete barrier to further hold the bracket support beam to the concrete barrier.

In an additional optional aspect of one or more of the above embodiments of the present invention, the wall support beam is configured to be situated adjacent to the concrete barrier and extend below the top wall and toward the support surface.

In an additional optional aspect of one or more of the above embodiments of the present invention, the bracket support beam has a length with a first portion and a second portion, where the second portion is located along the length between a distal end of the bracket support beam and the second portion. Also, the bracket is configured to be selectively attached to one of the first portion and the second portion.

In an additional optional aspect of one or more of the above embodiments of the present invention, the wall support beam is configured to extend down to rest upon the support surface.

In an additional optional aspect of one or more of the above embodiments of the present invention, a supplementary concrete barrier is provided and includes a supplementary top wall, a supplementary first side wall, a supplementary second side wall opposing the first side wall, and a supplementary bottom wall configured to rest upon the support surface. The wall support system further includes a third bracket having a third left bracket member spaced apart from a third right bracket member and a third top connecting member spanning between and connecting the third left bracket member to the third right bracket member. Additionally, the third left bracket member has a third left attachment portion and the third right bracket member has a third right attachment portion. Further, the third bracket is configured to be positioned overtop the bracket support beam at the second portion with the second top connecting member situated above the bracket support beam such that the second bracket straddles the bracket support beam with the second left bracket member and the third right bracket member on opposites sides of the bracket support beam. Also, the second left attachment portion of the second left bracket member and the second right attachment portion of the second right bracket member are each configured to be fastened to the supplementary first side wall of the concrete barrier to further hold the bracket support beam to the supplementary concrete barrier.

In an additional optional aspect of one or more of the above embodiments of the present invention, a fourth bracket is provided, and has a fourth left bracket member spaced apart from a fourth right bracket member and a fourth top connecting member spanning between and connecting the fourth left bracket member to the fourth right bracket member, Also, the fourth left bracket member has a fourth left attachment portion and the fourth right bracket member has a fourth right attachment portion. Additionally, the fourth bracket is configured to be positioned overtop the bracket support beam at the second portion, with the fourth top connecting member situated above the bracket support beam such that the fourth bracket straddles the bracket support beam with the fourth left bracket member and the fourth right bracket member on opposites sides of the bracket support beam.

Furthermore, the fourth left attachment portion of the fourth left bracket member and the fourth right attachment portion of the fourth right bracket member are each configured to be fastened to the second side wall of the supplementary concrete barrier to further hold the bracket support beam to the supplementary concrete barrier.

In an additional embodiment, the present invention is directed to a method of erecting the wall support system. The method comprises the steps of:
a) placing the concrete barrier upon a support surface;
b) positioning the wall support beam upon the support surface;
c) positioning the bracket support beam across the top wall of the
concrete barrier;
d) coupling one end of left bracket member and one end of the right
bracket member to the concrete barrier; and
e) coupling an other end of the left bracket member and an other end of the right bracket member to the bracket support beam.

BRIEF DESCRIPTION OF THE DRAWINGS

Further advantages of the present invention may become apparent to those skilled in the art with the benefit of the following detailed description of the preferred embodiments and upon reference to the accompanying drawings in which.

LISTING OF REFERENCE NUMERALS wall support system 20
first bracket 22
second bracket 24
third bracket 26
fourth bracket 28
wall framework 30
wall support beam 32
brace beam 33
bracket support beam 34
top wall 36, 38
first side wall 40, 44
second side wall 42, 46
bottom wall 48, 50
left bracket member 52
tight bracket member 54
top connecting member 56
bottom connecting member 58
second left bracket member 60
second right bracket member 62
second top connecting member 64
second bottom connecting member 66
third left bracket member 68
third right bracket member 70
third top connecting member 72
third bottom connecting member 74
fourth left bracket member 76
fourth right bracket member 78
fourth top connecting member 80
fourth bottom connecting member 82
first portion 84
second portion 86
third portion 87
distal end 88
proximal end 90
fastener 92
left attachment flange 94, 98
right attachment flange 100
left compression flange 102, 106
right compression flange 104, 108
through holes 110 through holes 112
wall panels W1,W2
concrete barriers B1,B2,B3,B4,B5,B6

DETAILED DESCRIPTION

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to he understood, however, that the same or equivalent structures and steps may be accomplished by different embodiments that are also intended to be encompassed within the spirit and scope of the invention.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to the drawings, wherein like reference numerals designate identical or corresponding features throughout the several views. Further, described herein are certain non-limiting embodiments of my invention.

FIGS. 1-8 illustrate an example embodiment of the wall support system 20 of the present invention. The wall support system has one or more brackets 22, 24, 26, and 28 that quickly and securely fasten the wall support system 20 to one or more concrete barriers B1, B2, B3, B4, B5, and B6.

Figures 1, 2:
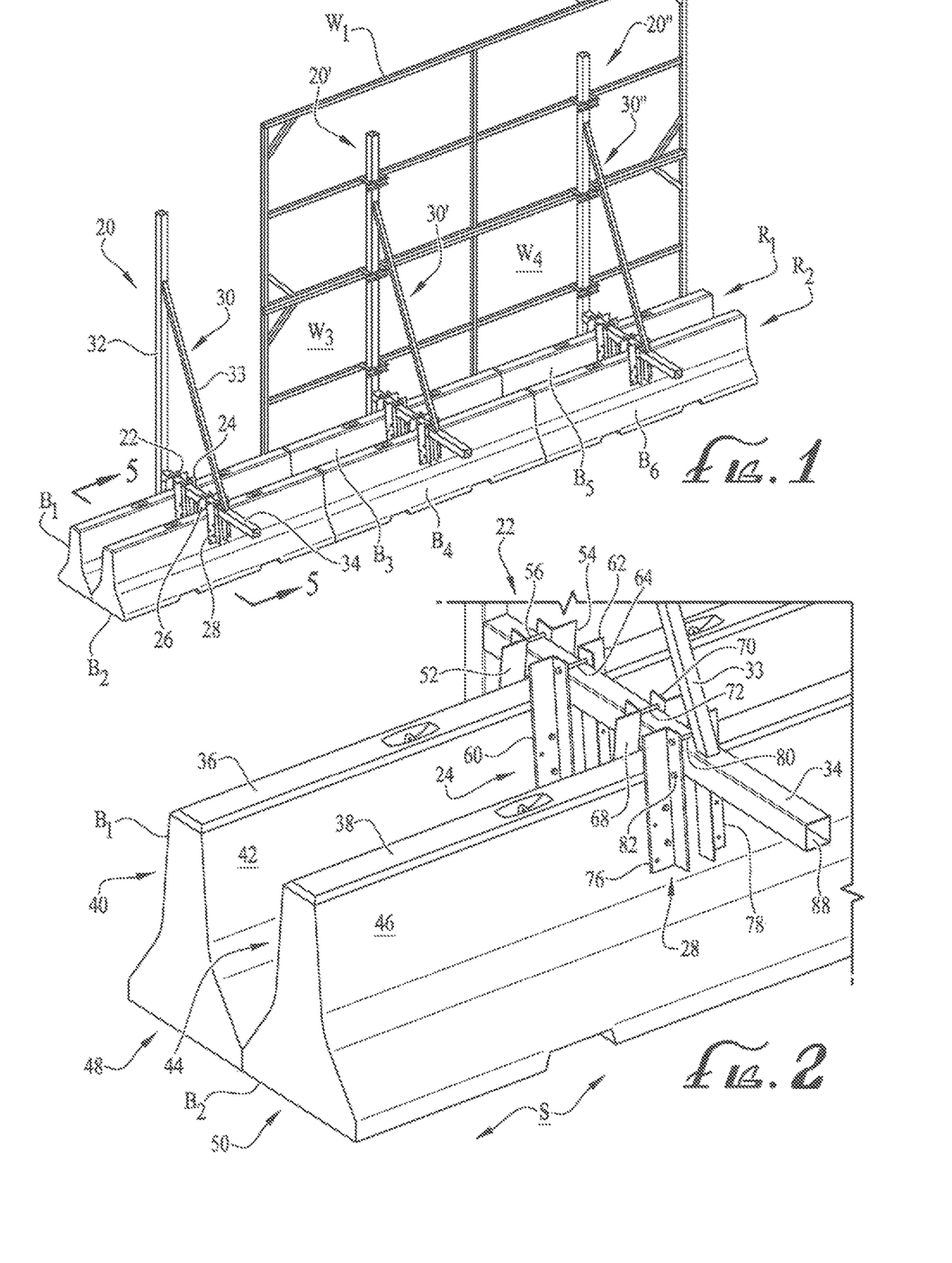
FIG. 1 is a perspective view of the present wall support system, including, the support framework, the wall panels, and the concrete barriers.
FIG. 2 is a magnified perspective of the wall support system of FIG. 1, focusing on the present bracket.

Looking at FIGS. 1 and 2 initially, a partially assembled sound attenuating wall assembly is illustrated, and would be placed between a noise source (such as construction, well drilling, a generator, or other noise generating activity) and a designated quite zone (such as housing, schools, parks, business districts, and the like). Here, the wall is comprised of a plurality of wall panels W1, W2, W3, and W4, and is made of sound attenuating materials, which are attached to and in position by watt support structures 20' and 20".

Wall support structure 20 (on the far left) is shown with the wall panels removed to more clearly illustrate the structure. Although two parallel rows R1 and R2 of concrete barriers B1, B2, B3, B4, B5, and B6 are shown (each row having a plurality of barriers in aligned end-to-end), there can be a single row of barriers or more than two rows. Further, the length of each row and the number of barriers within each row is governed by the requirement of the application, and may extend for miles and comprise hundreds or more barriers.

Each of wall support systems 20, 20', and 20" are substantially similar in construction, and thus only wall support system 20 will be discussed in detail in the below description. The example wall support system 20 includes a wall support beam 32 vertically oriented, a bracket support beam 34 welded, or otherwise attached, to the wall support beam 32 and extending transversely from the wall support beam 32 (extending at a ninety degree angle or horizontally in this case), with a knee brace beam 33 diagonally connecting the wall support beam 32 to the bracket support beam 34 for additional structural support. Because the components of the wall support system 20 are made of steel or other similarly strong material, the joints can be welded for a durable assembly.

Referring now to FIG. 2, the wall support system 20 further includes one or more brackets 22, 24, 26, and 28 that hold the bracket support beam 34 firmly to the top walls 36 and 38 of the barriers 36 and 38, respectively. Generally, the concrete barrier 91 and the optional supplementary concrete barrier 92 each include, respectively, a first side wall 40, 44, a second side wall 42, 46, a top wall 36, 38, and a bottom wall 48, 50, The side walls 40, 42, 44, 46 and top walls 36, 38 of the barriers form a top portion of the barrier and are configured for use with the wall support system 20 of the present invention. The bottom walls 48, 50 of the barriers forms a base of the respective barrier and is configured to rest upon a support surface, such as the ground, compacted earth, gravel, a road surface, or any other appropriate surface which can bear the weight of the system and provide a stable substrate. Preferably, although not necessarily, the base of each barrier is wider than the respective top portion of that barrier to provide the wall support system 20 with greater stability.

The four brackets 22, 24, 26, and 28 are focused upon ire FIG. 2, and are representative of the remaining brackets illustrated in FIG. 1. Thus, only brackets 22, 24, 26, and 28 will be described in great detail.

Figure 3:
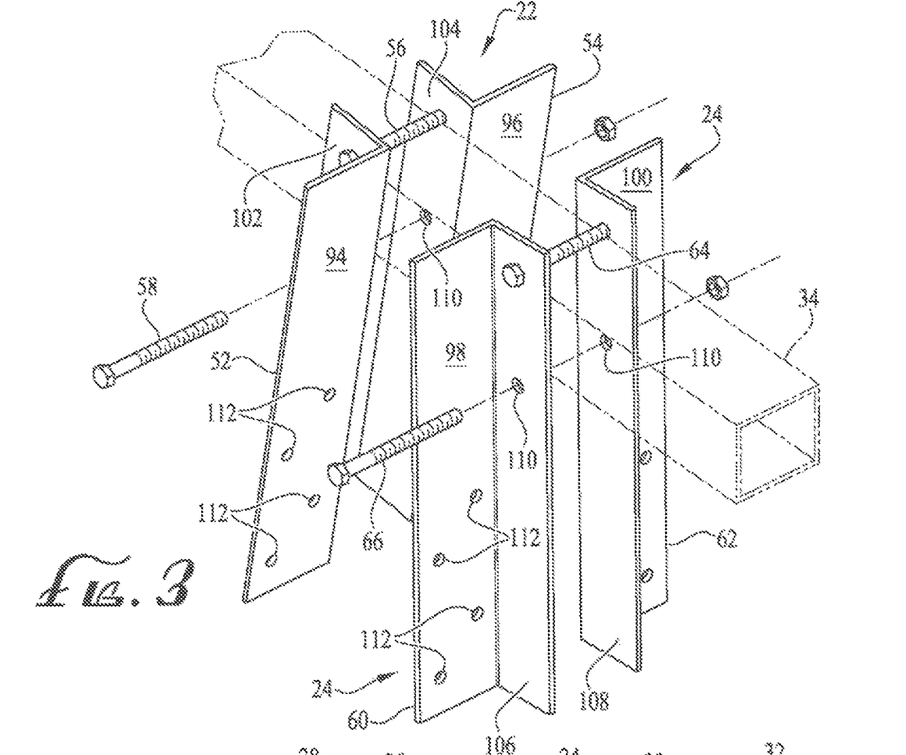
FIG. 3 is a partially exploded perspective view of the present bracket, illustrating its attachment to the bracket support beam.

Referring now to FIG. 3, each concrete barrier B1 and B2 requires at least one bracket to connect the bracket support beam 34 to the concrete barrier B1 and/or B2. However, in the illustrated example embodiment, two brackets 22, 24 and 26, 28 are used for each connection.

Looking individually at each bracket in FIG. 3, bracket 22 is positioned at the first portion 84 of the bracket support beam 34 and includes a left bracket member 52 spaced apart from a right bracket member 54 and connected over the spacing by the top connecting member 56 to form an initial assembly, ready for the attachment process.

Also viewing FIG. 3, in this example embodiment, the top connecting member 56 (as well as the remaining connecting members 58, 64, 66, 72, 74, 80, and 82) is a threaded bolt with a corresponding nut, where the distance between the nut and head of the bolt determine the spacing between the left bracket member 52 and the right bracket member 54. In one or more alternate embodiments, the nut and the bolt may be permanently connected, by welding, crimping of the threads, or the like. Alternatively, a shaft with permanent heads on each side can be used to capture the left bracket member 52 and the right bracket member 54, Further, in one or more alternate embodiments, the top connecting member 56 can be permanently connected or removably connected to the left bracket member 52 and the right bracket member 54.

In the illustrated example embodiment, each of the left bracket members 52, 60 and each of the right bracket members 54, 62 are generally L-shaped metal stock (e.g., 90 degree steel or the like). The left bracket member 52 includes a left attachment flange 94 and a left compression flange 102. The right bracket member 54 includes a right attachment flange 96 and a right compression flange 102. Each of the left attachment flanges 94, 98 and the right attachment flange 96, 100 include a plurality of through holes 112 for receiving therethrough a plurality of fasteners 92 (such as concrete screws, bolts, or other such fastener), which permits the attachment flanges 94 and 96 to be fastened to the first side wall 40 or the second sidewall 42, respectively, of the concrete barrier B1.

Each of the left compression flange 102 and the right compression flange 104 are formed, in this embodiment, normally to their respective attachment flanges 94 and 96, and each include a plurality of through holes 110 (preferably two) for receiving therethrough their corresponding connecting member 56, 58, 64, and 66. The left compression flange 102 and the right compression flange 104 of the first bracket 22 are configured to face one another, and if desired, to compress the bracket support beam 34 therebetween for preventing lateral sliding of the bracket support beam 34 relative to the first bracket 22. Likewise, the left compression flange 106 and the right compression flange 108 of the second bracket 24 are configured to face one another, and if desired, to compress the bracket support beam 34 therebetween for preventing lateral sliding of the bracket support beam 34 relative to the second bracket 24.

Still referencing FIGS. 1-4, during assembly of the present wall support system 20, local wind load conditions incident on the wall are considered in the calculated placement of the concrete barrier B1. If barrier B1 provides insufficient counterbalance to resist toppling or unwanted swaying of the wall when positioned close to the wall panel W1. (which acts as a sail under windy conditions) at a first portion 84 of the bracket support beam 34, the position of the barrier B1 can be adjusted such that barrier B1 attaches to the bracket support beam 34 further away from the proximal end 90 of the bracket support beam 34 and closer to the distal end 88 of the bracket support beam 34 (e.g., to a second portion 88 of the bracket support beam 34) to increase the moment arm over which the weight of the barrier B1 acts (or the entire row of barriers, of which B1 is part).

Figure 4:
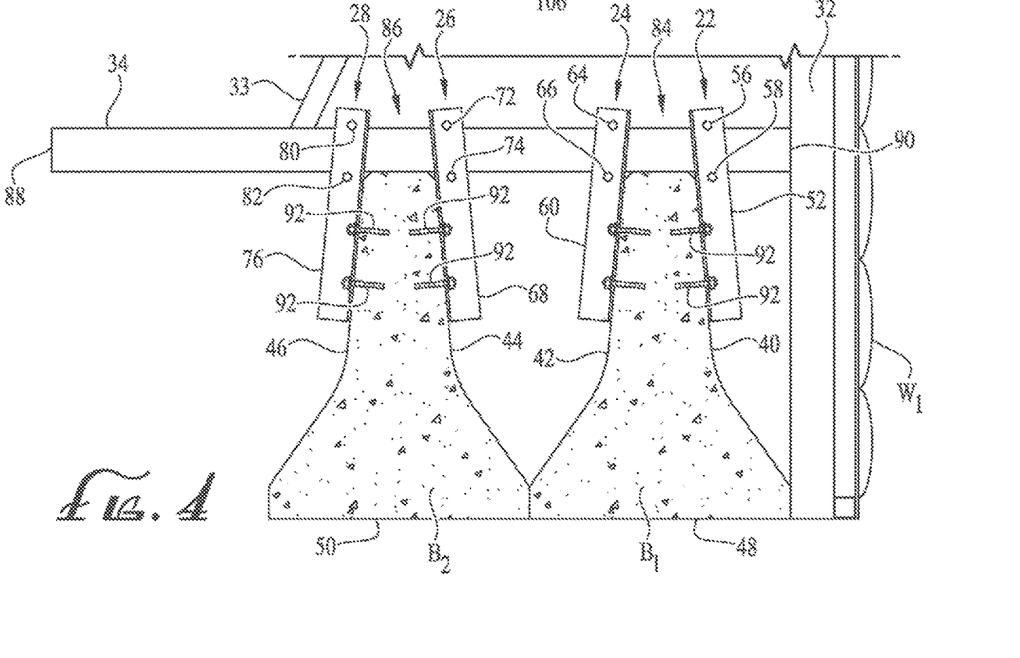
FIG. 4 is a side cross-sectional view of the wall support system of FIG. 1 taken along 5-5, illustrating the attachment of the bracket to the concrete barrier.

If the weight of barrier B1 is insufficient to hold the wall erect and vertical, even when positioned nearest to the distal end 88, a supplementary barrier B2 can be added, where barrier B2 is positioned substantially parallel to B1 (e.g., row R1 is substantially parallel to row R2, understanding that each barrier within the rows may be set or knocked askew within the limits of the present system's adjustability). As shown in FIG. 4, barrier B2 is positioned alongside barrier B1, wherein barrier B2 and barrier Bi are touching or in close proximity at their bases.

Again, during assembly and erection of the present system 20, the attached wall panels W1, W2, W3, and W4, the barriers B1 and B2, and the position of each barrier B1 and B2 (or just one row of barriers, or even more than two rows of barriers), is determined and set on the support surface by heavy machinery. The placement of the wall support beam 32 upon the support surface can also be determined, if the wall support beam 32 is positioned a distance away from barrier B1. The framework 30 of the wall support system 20 is erected, such that the wall support beam 32 is oriented substantially vertical and the bracket support beam 34 is positioned to lie across the top walls 36 and 38 of barriers B1 and B2, respectively. As the framework 30 is temporarily held in position, the worker places the first bracket 22 overtop the bracket support beam 34, with the top connecting member 56 bearing on the bracket support beam 34 to support the first bracket 22 in close proximity to the first side wall 40. Likewise, the worker places the second bracket 24 overtop the bracket support beam 34, with the top connecting member 64 bearing on the bracket support beam 34 to support the second bracket 24 in close proximity to the second side wall 42. Thereafter, the worker inserts each of the bottom connecting members 58 and 66 into their respective through holes 110, with the bottom connecting members 58 and 66 positioned below the bracket support beam 34.

As the worker begins to tighten (or at least hand-tighten) the connecting members 56, 58, 64, and 66, the attachment flanges 94, 96, 98, and 100 are pressed against their respective side walls 40, 42, 44, and 46 of the barriers B1, B2 so that each flange 94, 96, 98, and 100 rests flatly against the side walls 40, 42, 44, and 46 of the barriers B1, B2 and the brackets 22, 24, 26, and 28 are angled to match the angles of the side walls 40, 42, 44, and 46 of.

Holes can be drilled into the concrete barriers B1 and B2 at the locations of at least some of the through holes 112 on the attachment flanges 94, 96, 98, and 100. Once the holes in the concrete barriers B1 and B1 are drilled, concrete screws can be driven in to secure the attachment flanges 94, 96, 98, and 100 to the side walls 40, 42, 44, and 46 of the barriers B1 and B2. Then, the bottom connecting members 58, 66, and 82 and, optionally, the top connecting members 56, 64, 72, and 80 of the brackets 22, 24, 26, and 28 are tightened to a set torque or until sufficiently tight to prevent lateral sliding of the bracket support beam 34 relative to the brackets 22, 24, 26, and 28 under expected load conditions.

Figure 5:
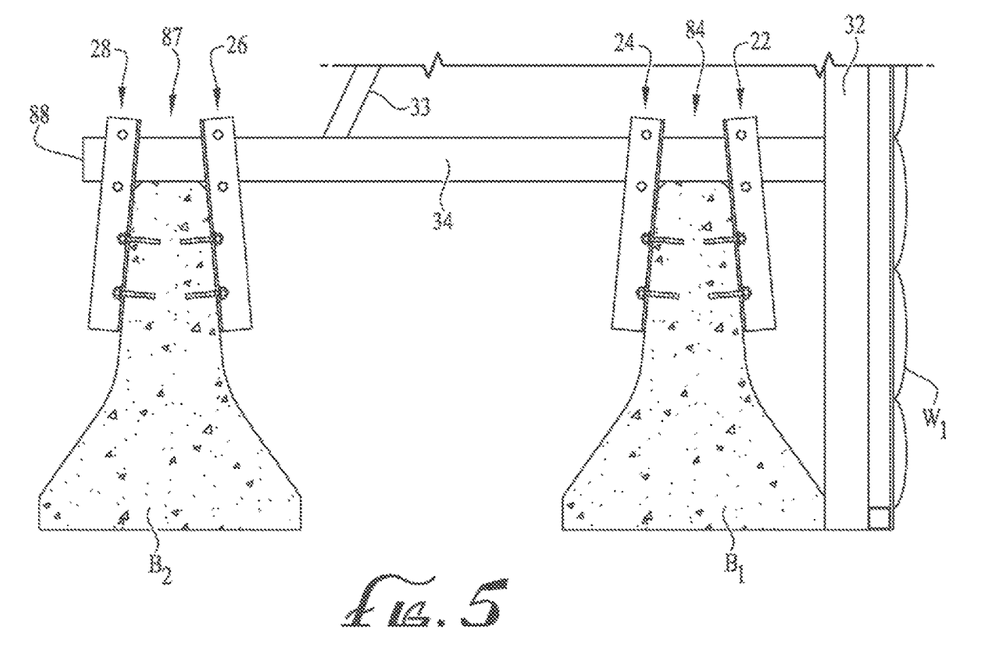
FIG. 5 is a side cross-sectional. view of the wall support system of FIG. 4, illustrating the movement of the concrete barrier further to the left for additional stability.

Advantageously, the brackets 22, 24, 26, and 28 of the present invention are designed to pivot about the top connecting members 56, 64, 72, and 80 when resting atop the bracket support beam 34 to match the angle of the side walls 40, 42, 44, and 46 of the barriers B1 and B2. Further, the brackets 22, 24, 26, and 28 of the present invention are designed to adjust for varying widths of barriers, where the distance between mating pair of brackets can be increased or decreased according to the width of the top portion of the traffic barrier. FIGS. 4 and 5 illustrate a first type of traffic barrier B1 and B2, with the brackets 22, 24, 26, and 28 arranged at a first angle and at a first width.

Figure 6:
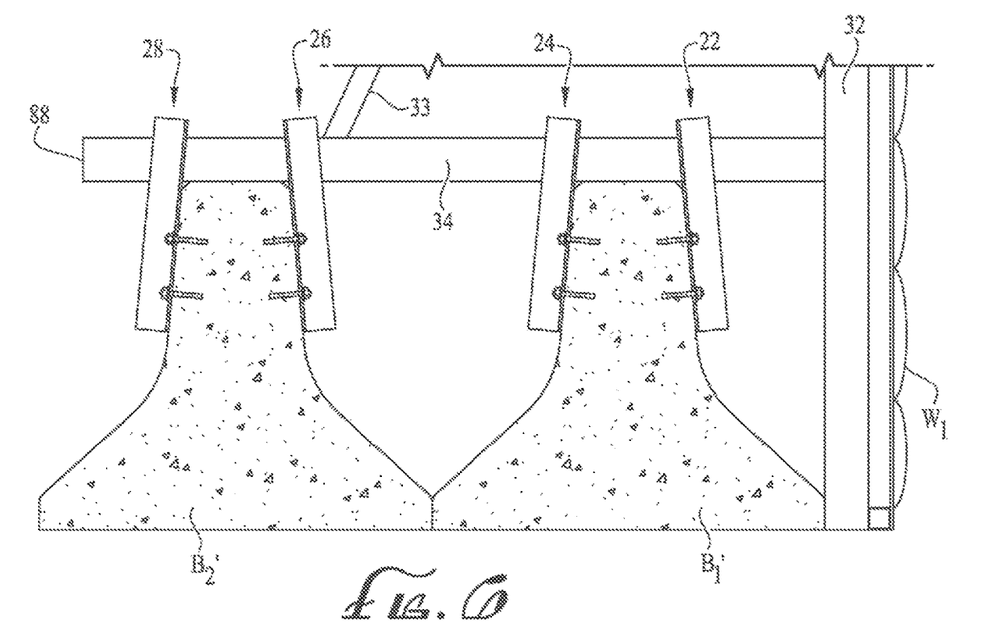
FIG. 6 is a side cross-sectional view of the wall support system illustrating an alternate style of concrete barrier.

FIG. 6 illustrates a second type of traffic barrier B1' and B2' (which are thicker in comparison at the top portion), with the brackets 22, 24, 26, and 28 arranged at a second angle and at a second width.

Figure 7:
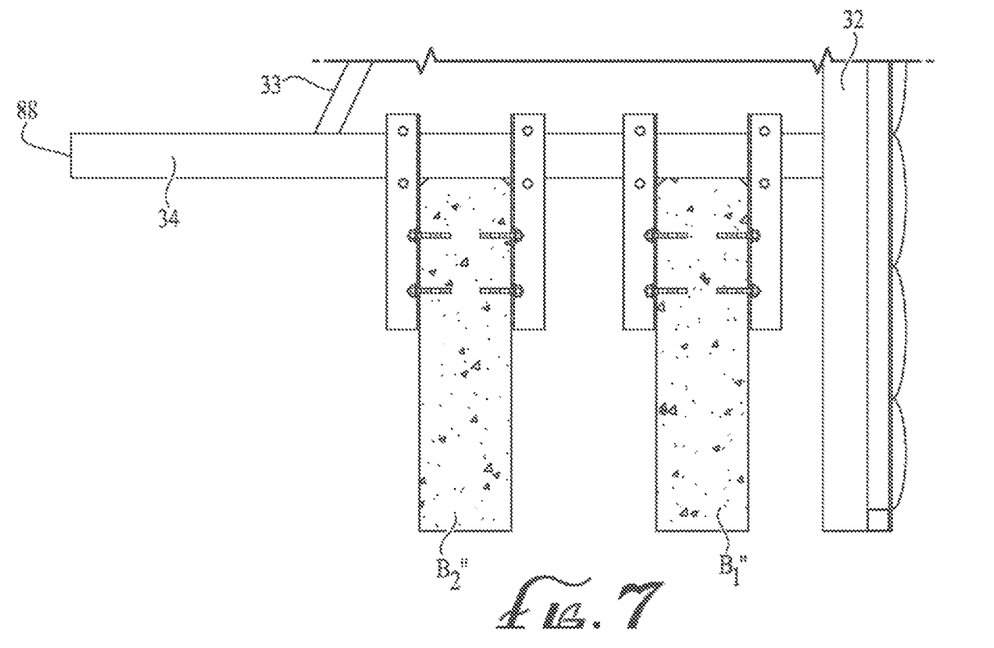
FIG. 7 is a side cross-sectional view of the wall support system, illustrating another alternate style of concrete barrier.

FIG. 7 illustrates a third type of traffic barrier B1" and B2" (which are thinner in comparison to the other illustrated barriers), with the brackets 22, 24, 26, and 28 arranged at a third angle (zero or near zero, or 90 degrees to the bracket support beam 34) and at a third width.

Figure 8:
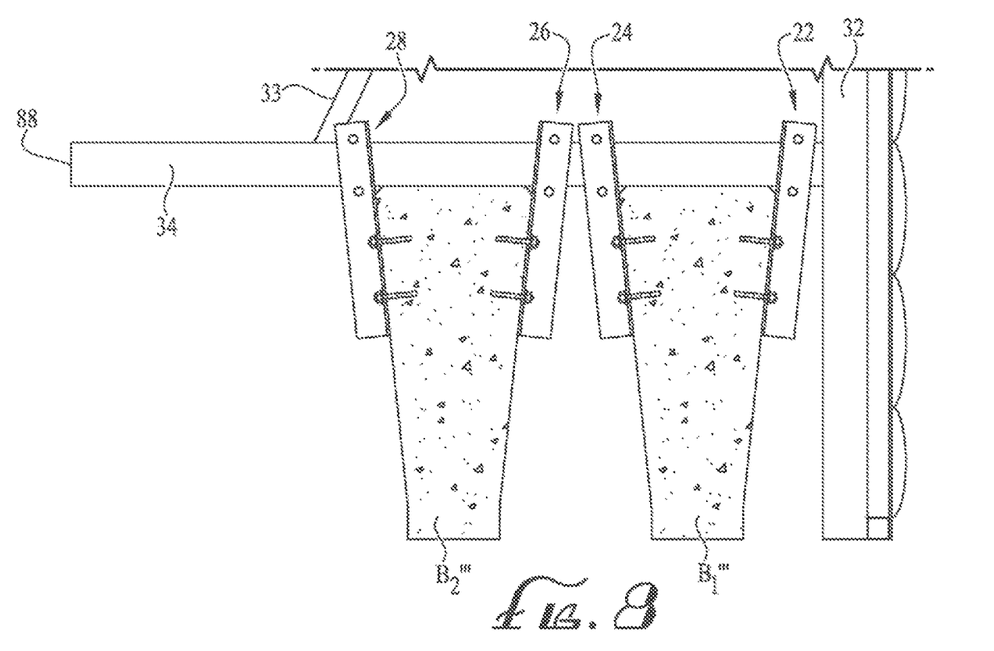
FIG. 8 is a side cross-sectional view of the wall support system, illustrating yet another alternate style of concrete barrier.

FIG. 8 illustrates a fourth type of traffic harrier B1''' and B2'– (which are wide at the top and narrow at the bottom creating a negative angle), with the brackets 22, 24, 26, and 28 arranged at a fourth angle (toed inward to match the negative angle of the barriers) and at a fourth width.

Thus, it can be seen that the brackets 22, 24, 26, and 28 of the present system 20 can be adjusted to match the angle and width of most concrete harriers so that the attachment flanges 94, 96, 98, and 100 can closely fit against each respective side wall 40, 42, 44, and 46 to substantially eliminate gaps between the brackets 22, 24, 26, and 28 and the barriers, to create a strong and tight-fitting joint between the two. Further, the brackets 22, 24, 26, and 28 of the present invention permit sliding adjustment along the bracket support beam 34 to adjust for various load conditions depending on the height of the wall, location of the wall, the wind conditions, etc.

Although the present bracket system is shown attaching a framework having a particular design to concrete barriers, the design of the framework itself may vary according to the application and design requirements for supporting a particular load.

While particular forms of the invention have been illustrated and described, it will also be apparent to those skilled in the art that various modifications can be made without departing from the spirit and scope of the invention. Accordingly, it is not intended that the invention be limited except by the claims.

What is claimed is:

1. A wall support system for attachment to a concrete barrier having a top wall, a first side wall, a second side wall opposing the first side wall, and a bottom wall configured to rest upon a support surface, the wall support system comprising:
    a) a bracket having:
        i) a left bracket member;
        ii) a right bracket member spaced apart from the left bracket member;
        iii) a top connecting member spanning between and connecting the left bracket member to the right bracket member, the left, bracket member having a left attachment portion and the right bracket member having a right attachment portion;
        iv) a bottom connecting member spanning between and connecting the left bracket member to the right bracket member; and
    b) a wall framework having:
        i) a wall support beam; and
        ii) a bracket support beam attached to and extending transversely from the wall support beam;
    wherein the bottom connecting member is configured to be situated below the bracket support beam to capture the bracket support beam between the top connecting member and the bottom connecting member;
    wherein the bracket support beam is configured to transversely extend across the top wall of the concrete barrier;
    wherein the bracket is configured to be positioned overtop the bracket support beam with the top connecting member situated above the bracket support beam such that the bracket straddles the bracket support beam with the left bracket member and the right bracket member on opposites sides of the bracket support beam; and
    wherein the left attachment portion of the left bracket member and the right attachment portion of the right bracket member are each configured to be fastened to the first side wall of the concrete barrier to hold the bracket support beam to the concrete barrier.

2. The wall support system of claim 1 wherein the attachable top connecting member comprises a top bolt with a top nut threaded thereon, capturing therebetween the left bracket member and the right bracket member.

3. The wall support system of claim 1 wherein the attachable bottom connecting member comprises a bottom bolt with a bottom nut threaded thereon, capturing therebetween the left bracket member and the right bracket member.

4. The wall support system of claim 1 wherein the bottom connecting member is configured to be installed after the top connecting member is situated above the bracket support beam.

5. A wall support system for attachment to a concrete barrier having a top wall, a first side wall, a second side wall opposing the first side wall, and a bottom wall configured to rest upon a support surface, the wall support system comprising:
    a) a bracket having a left bracket member spaced apart from a right bracket member and a top connecting member spanning between and connecting the left bracket member to the right bracket member, the left bracket member having a left attachment portion and the right bracket member having a right attachment portion; and
    b) a wall framework having a wall support beam and a bracket support beam attached to and extending transversely from the wall support beam;
    wherein the bracket support beam is configured to transversely extend across the top wall of the concrete barrier;
    wherein the bracket is configured to be positioned overtop the bracket support beam with the top connecting member situated above the bracket support beam such that the bracket straddles the bracket support beam with the left bracket member and the right bracket member on opposites sides of the bracket support beam; and
    wherein the left attachment portion of the left bracket member and the right attachment portion of the right bracket member are each configured to be fastened to the first side wall of the concrete barrier to hold the bracket support beam to the concrete barrier.

6. The wall support system of claim 5 wherein the bracket further comprises a bottom connecting member spanning between and connecting the left bracket member to the right bracket member and configured to be situated below the bracket support beam to capture the bracket support beam between the top connecting member and the bottom connecting member.

7. The wall support system of claim 5 wherein the attachable top connecting member comprises a top bolt with a top nut threaded thereon, capturing therebetween the left bracket member and the right bracket member.

8. The wall support system of claim 6 wherein the attachable bottom connecting member comprises a bottom bolt with a bottom nut threaded thereon, capturing therebetween the left bracket member and the right bracket member.

9. The wall support system of claim 6 wherein the bottom connecting member is configured to be installed after the top connecting member is situated above the bracket support beam.

10. The wall support system of claim 5 further comprising:
    a second bracket having a second left bracket member spaced apart from a second right bracket member and a second top connecting member spanning between and connecting the second left bracket member to the second right bracket member, the second left bracket member having a second left attachment portion and the second right bracket member having a second right attachment portion;
    wherein the second bracket is configured to be positioned overtop the bracket support beam with the second top connecting member situated above the bracket support beam such that the second bracket straddles the bracket support beam with the second left bracket member and the second right bracket member on opposites sides of the bracket support beam; and
    wherein the second left attachment portion of the second left bracket member and the second right attachment portion of the second right bracket member are each configured to be fastened to the second side wall of the concrete barrier to further hold the bracket support beam to the concrete barrier.

11. The wall support system of claim 5 wherein the wall support beam is configured to be situated adjacent to the concrete barrier and configured to extend below the top wall and toward the support surface.

12. The wall support system of claim 5 wherein:

the bracket support beam has a length having a first portion and a second portion, the second portion located along the length between a distal end of the bracket support beam and the second portion; and Wherein the bracket is configured to be selectively attached to one of the first portion and the second portion.

13. The wall support system of claim 12 wherein the wall support beam is configured to extend down to rest upon the support surface.

14. The wall support system of claim 12 for further attachment to a supplementary concrete barrier having a supplementary top wall, a supplementary first side wall, a supplementary second side wall opposing the first side wall, and a supplementary bottom wall configured to rest upon the support surface, the wail support system further comprising:
a third bracket having a third left bracket member spaced apart from a third right bracket member and a third top connecting member spanning between and connecting the third left bracket member to the third right bracket member, the third left bracket member having a third left attachment portion and the third right bracket member having a third right attachment portion;
wherein the third bracket is configured to be positioned overtop the bracket support beam at the second portion with the second top connecting member situated above the bracket support beam such that the second bracket straddles the bracket support beam with the second left bracket member and the third right bracket member on opposites sides of the bracket support beam; and
wherein the second left attachment portion of the second left bracket member and the second right attachment portion of the second right bracket member are each configured to be fastened to the supplementary first side wall of the concrete barrier to further hold the bracket support beam to the supplementary concrete barrier.

15. The wall support system of claim 14 further comprising:
a fourth bracket having a fourth left bracket member spaced apart from a fourth right bracket member and a fourth top connecting ember spanning between and connecting the fourth left bracket member to the fourth right bracket member, the fourth left bracket member having a fourth left attachment portion and the fourth right bracket member having a fourth right attachment portion;
wherein the fourth bracket is configured to be positioned overtop the bracket support beam at the second portion with the fourth top connecting member situated above the bracket support beam such that the fourth bracket straddles the bracket support beam with the fourth left bracket member and the fourth right bracket member on opposites sides of the bracket support beam; and
wherein the fourth left attachment portion of the fourth left bracket member and the fourth right attachment portion of the fourth right bracket member are each configured to be fastened to the second side wall of the supplementary concrete barrier to further hold the bracket support beam to the supplementary concrete barrier.

16. A method of erecting the wall support system of claim 1, the method comprising the steps of:
a) placing the concrete barrier upon a support surface;
b) positioning the wall support beam upon the support surface;
c) positioning the bracket support beam across the top wall of the concrete barrier;
d) coupling one end of left bracket member and one end of the right bracket member to the concrete barrier; and
e) coupling an other end of the left bracket member and an other end of the right bracket member to the bracket support beam.

* * * * *